(12) United States Patent
Wildash (10) Patent No.: US 8,289,737 B2
(45) Date of Patent: Oct. 16, 2012

(54) BRIDGELESS BOOST PFC CIRCUITS AND SYSTEMS WITH REDUCED COMMON MODE EMI

(75) Inventor: Kevin D. Wildash, Adelaide (AU)

(73) Assignee: Astec International Limited, Kwun Tong, Kowloon (HK)

( * ) Notice: Subject to any disclaimer, the term of this patent is extended or adjusted under 35 U.S.C. 154(b) by 534 days.

(21) Appl. No.: 12/539,045

(22) Filed: Aug. 11, 2009

(65) Prior Publication Data
US 2011/0037444 A1 Feb. 17, 2011

(51) Int. Cl.
*H02M 1/12* (2006.01)
*H02M 7/00* (2006.01)

(52) U.S. Cl. .................... 363/44; 363/125

(58) Field of Classification Search ........... 363/39, 363/44–46, 52, 53, 84, 89, 90, 125–127; 323/222–225, 268, 271
See application file for complete search history.

(56) References Cited

U.S. PATENT DOCUMENTS

| | | | |
|---|---|---|---|
| 5,793,624 A | 8/1998 | Couture et al. | |
| 6,282,109 B1 | 8/2001 | Fraidlin et al. | |
| 6,437,999 B1 * | 8/2002 | Wittenbreder | 363/39 |
| 6,735,097 B1 | 5/2004 | Prasad et al. | |
| 7,215,560 B2 * | 5/2007 | Soldano et al. | 363/44 |
| 7,265,650 B2 | 9/2007 | Jang et al. | |
| 7,919,950 B2 * | 4/2011 | Uno et al. | 323/207 |
| 2006/0013024 A1 | 1/2006 | Temesi et al. | |
| 2006/0220628 A1 * | 10/2006 | Soldano | 323/282 |
| 2007/0279955 A1 | 12/2007 | Liu et al. | |
| 2011/0149622 A1 * | 6/2011 | Lin | 363/124 |

* cited by examiner

*Primary Examiner* — Matthew Nguyen
(74) *Attorney, Agent, or Firm* — Harness, Dickey & Pierce, P.L.C.

(57) ABSTRACT

According to one example embodiment, a bridgeless boost power factor correction (PFC) system includes a first input for connection to a first line of an alternating current (AC) source and a second input for connection to a second line of the AC source. The PFC system includes an output for delivering an output of the bridgeless boost PFC system, a first boost choke coupled to the first input and a second boost choke coupled to the second input. A common mode choke is coupled between the first and second input and the first and second boost choke. A first X capacitor is coupled between the first input and the output and a second X capacitor coupled between the second input and the output.

17 Claims, 5 Drawing Sheets

BRIDGELESS BOOST PFC CIRCUITS AND SYSTEMS WITH REDUCED COMMON MODE EMI

FIELD

The present disclosure relates to the bridgeless boost power factor correction (PFC) circuits and systems. In particular, this disclosure relates to bridgeless boost PFC circuits and systems with reduced common mode electromagnetic interference (EMI).

BACKGROUND

Switching mode power supplies can generate high frequency noise which travels over the power lines and interferes with the operation of computers and other electronic devices connected to the power lines. EMI in the environment induces or couples electrical noise into the power lines. EMI generated by the noise signals is generally an unwanted disturbance that may affect an electrical circuit. The disturbance can interrupt, obstruct, or otherwise degrade or limit the effective performance of the circuit.

Electrical noise is classified into two types according to the conduction mode. Electrical noise which comes in one power line wire and returns to the noise source through the other power line wire is termed as differential noise. Differential noise travels in opposite directions in its forward and return paths. Electrical noise which comes through one power line and returns to the noise source through a reference ground path is termed as common mode noise. The common mode noise travels in the same direction in the power line wires.

In an electrical power system, a load with a low power factor draws more current than a load with a high power factor for the same amount of useful power transferred. Accordingly, PFC circuits are often used to reduce the power factor of an electrical power system.

Figure 1:
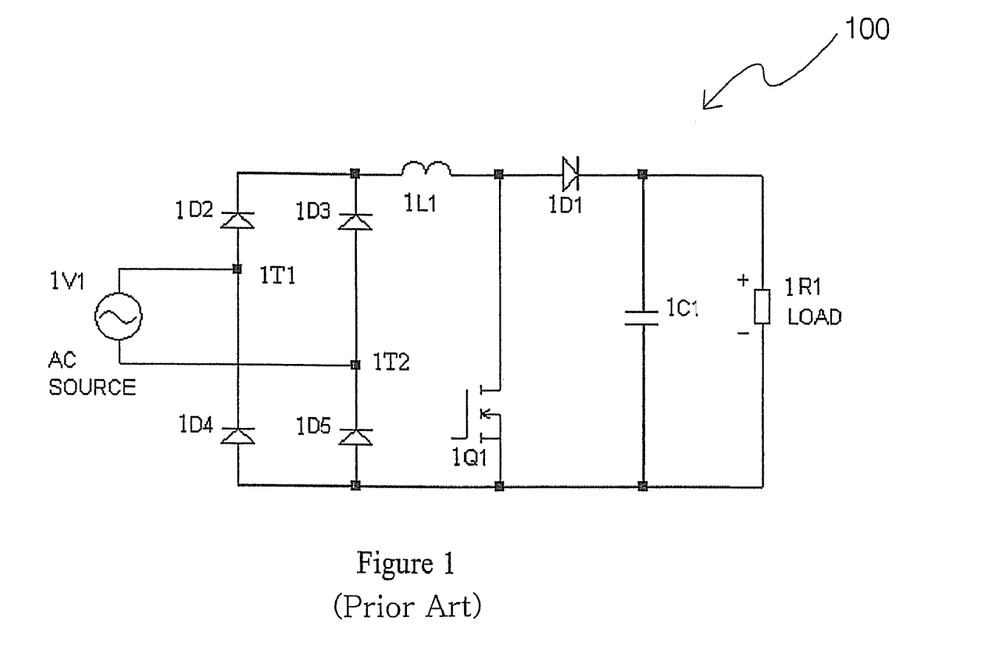
FIG. 1 illustrates a conventional boost PFC system that uses a diode bridge rectifier.
Figure 2:
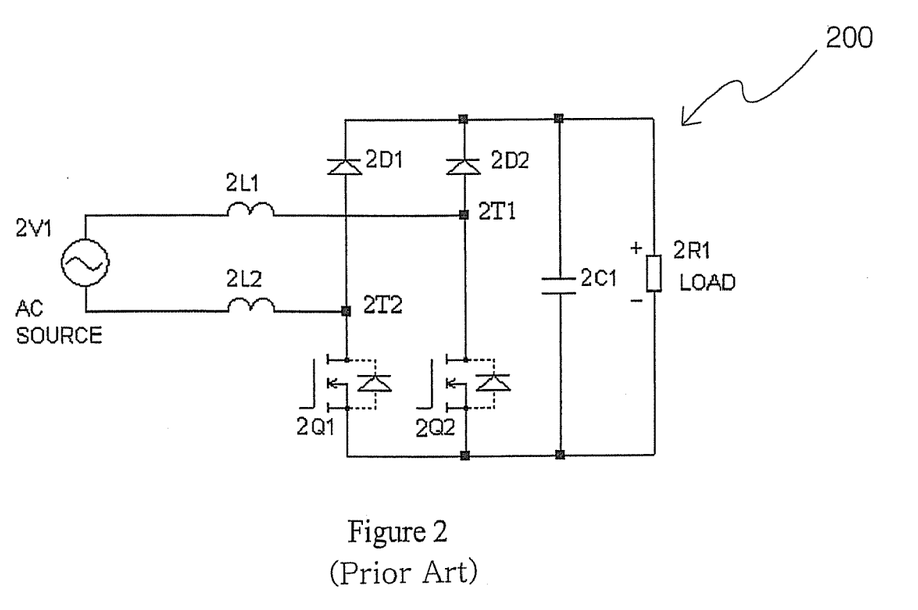
FIG. 2 illustrates a conventional bridgeless boost PFC system.

A conventional boost power factor correction (PFC) system 100 that uses a diode bridge rectifier is illustrated in FIG. 1. FIG. 2 illustrates a bridgeless boost PFC system 200.

Various techniques have been used to improve the efficiency and/or filter common mode conducted EMI in a PFC circuit.

SUMMARY

This section provides a general summary of the disclosure, and is not a comprehensive disclosure of its full scope or all of its features.

According to one example embodiment, a bridgeless boost power factor correction (PFC) system includes a first input for connection to a first line of an alternating current (AC) source and a second input for connection to a second line of the AC source. The PFC system includes an output for delivering an output of the bridgeless boost PFC system, a first boost choke coupled to the first input and a second boost choke coupled to the second input. A common mode choke is coupled between the first and second input and the first and second boost choke. A first X capacitor is coupled between the first input and the output and a second X capacitor coupled between the second input and the output.

According to another embodiment, a method for power factor correction in an AC power current carrying system is disclosed. The method includes receiving and storing energy from an incoming AC power supply in a first and second boost choke and presenting a relatively high input impedance to the boost chokes. The method also includes rectifying the incoming AC power supply using a combination of a pair of rectifier diodes and semiconductor switches and controlling a duty cycle of the semiconductor switches. The method also includes bypassing an input line of the AC power supply to an output terminal with a relatively low impedance so that a small high frequency potential difference exists between the input line of the AC power supply and said output terminal to reduce common mode conducted electromagnetic interference (EMI).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The present disclosure envisages a power factor correction system using a bridgeless boost system with reduced common mode (CM) conducted electromagnetic interference (EMI) generated by the PFC system itself and the EMI from the source of input AC power supply.

Figure 3:
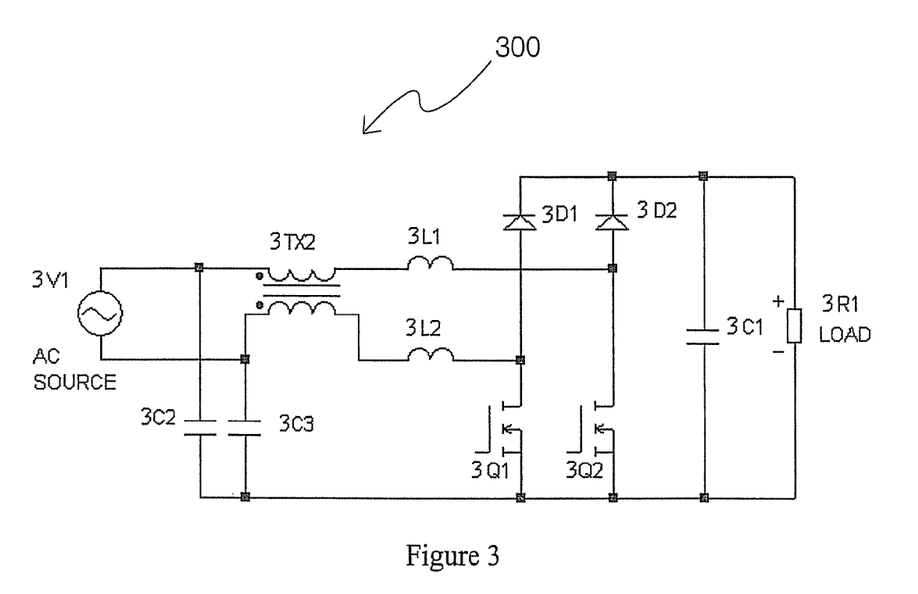
FIG. 3 illustrates a bridgeless boost PFC system with a common mode choke in accordance with one embodiment of the present disclosure.

FIG. 3 illustrates a bridgeless boost PFC system with a common mode choke 3TX2 in accordance with one embodiment of the present disclosure and is referenced generally by numeral 300. This system is explained in detail herein below.

The system 300 includes a common mode choke 3TX2 and two X capacitors 3C2 and 3C3. The common mode choke 3TX2 and the X capacitors 3C2 and 3C3 reduce the common mode conducted EMI. The X capacitors 3C2 and 3C3 are not connected to safety earth or chassis ground, and therefore their capacitance value is not limited by the safety standards applicable to Y capacitors. Large values such as 100 nF or more can be used which makes the EMI filtering very effective.

The common mode choke 3TX2 presents a relatively high impedance to the input terminals of the inductors, also referred to as boost chokes, 3L1 and 3L2. The X capacitors 3C2 and 3C3 bypass the input AC lines to the negative output terminal with a relatively low impedance, resulting in very low high frequency potential difference between the input AC lines and the output terminal. Therefore, the common mode conducted EMI is very low. In accordance with the present disclosure, additional Y capacitors (not shown) can be added to the chassis ground to further improve the EMI filtering, with no impact on the boost operation.

The common mode choke 3TX2 has a significant core loss due to the high frequency voltage applied to it. Accordingly, a low loss transformer ferrite or equivalent material is generally used, rather than the usual very high permeability high loss ferrites used in most common mode chokes. However, the magnetic core is not required to store appreciable energy, unlike the larger boost chokes required in the prior art and therefore it occupies less space than those in the prior art. It can also use cheaper materials than in the prior art.

The X capacitors 3C2 and 3C3 do not conduct the high switching ripple current from the boost chokes Instead, the current through the X capacitors 3C2 and 3C3 is only the magnetizing current of the common mode choke 3TX2.

Figure 4:
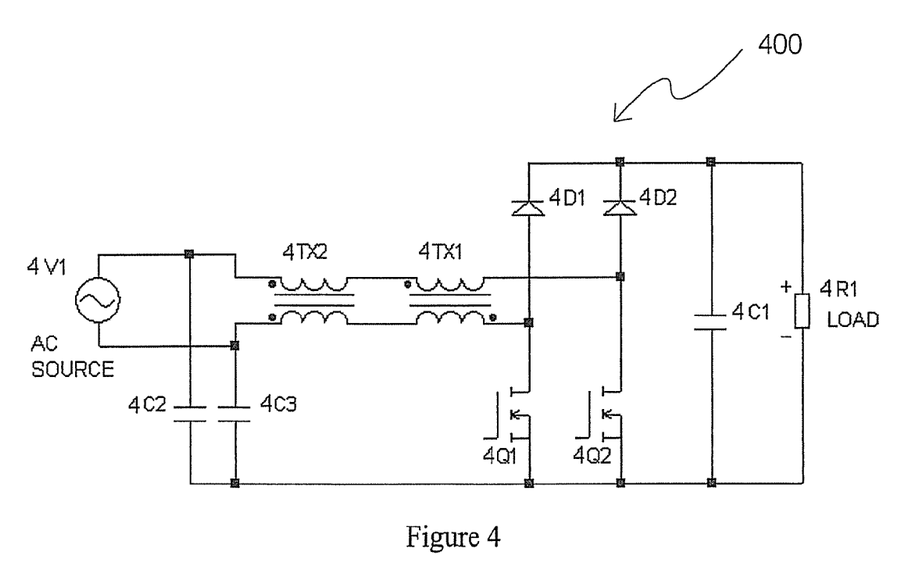
FIG. 4 illustrates a bridgeless boost PFC system with a common mode choke coupled with a common core boost choke in accordance with another embodiment of the present disclosure.

The inductors 3L1 and 3L2 operate in series at all times during boost operation, therefore each inductor can be sized to have a value that is half of the total required boost inductance. This may result in savings of cost and space. Additionally, the inductors 3L1 and 3L2 have identical current waveforms; therefore they can be wound on the same magnetic core, possibly resulting in additional cost and space savings. This is illustrated in FIG. 4 wherein a bridgeless boost PFC system with a common mode choke 4TX2 coupled with a common core boost choke 4TX1, in accordance with another embodiment of the present disclosure is disclosed and is referenced generally by numeral 400.

Figure 5:
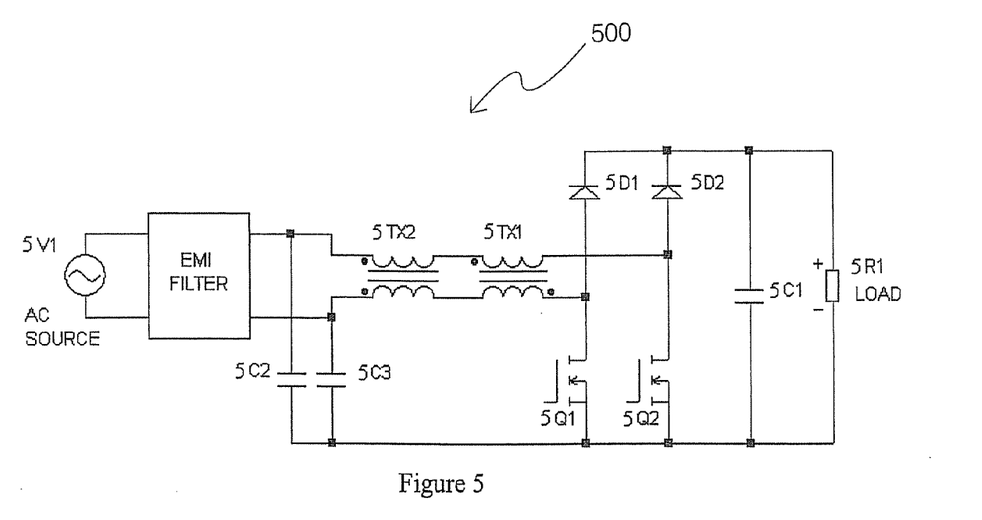
FIG. 5 illustrates a bridgeless boost PFC system with an EMI filter in addition to a common mode choke coupled with a common core boost choke in accordance with one embodiment of the present disclosure.

Although the common mode conducted EMI in a bridgeless boost PFC according to the embodiments discussed above is reduced over other known bridgeless boost PFC systems, some applications may benefit from additional EMI filtering at the AC input. FIG. 5 illustrates a bridgeless boost PFC system with an EMI filter in addition to a common mode choke 5TX2 coupled with a common core boost choke 5TX1 in accordance with one embodiment of the present disclosure and is referenced generally by numeral 500. The EMI filter may include one or more of additional X capacitors across the AC lines, Y capacitors from the AC lines to chassis ground, additional common mode chokes, and differential mode chokes. This filter is adapted to permit voltage boosting without disruption in the system operation.

Figure 6:
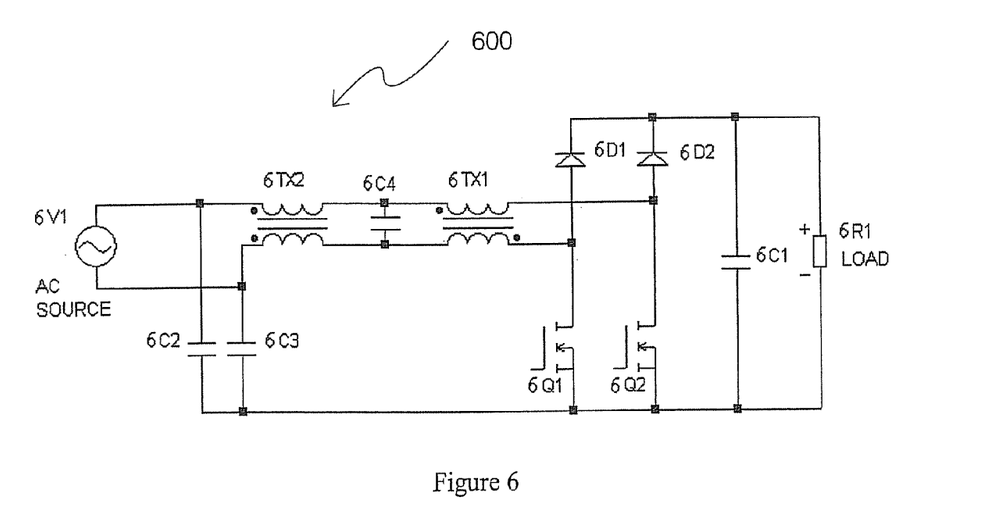
FIG. 6 illustrates a bridgeless boost PFC system with an additional X capacitor in accordance with another embodiment of the present disclosure.

FIG. 6 illustrates a bridgeless boost PFC system with an additional X capacitor 6C4 in accordance with another embodiment of the present disclosure and is referenced generally by numeral 600. The additional X capacitor 6C4 is added to bypass the leakage inductance of common mode choke 6TX2, which prevents this leakage inductance from storing additional boost energy.

In accordance with yet another embodiment of the present disclosure, it is possible to connect the X Capacitors 6C2 and 6C3 to the positive output terminal of any of the bridgeless boost PFC systems described herein instead of the negative output terminal. As the shunt capacitor 6C1 has a relatively low impedance, the positive and negative output terminals are at the same high frequency potential, therefore they are equivalent. The performance of the system would not change with this modification.

In accordance with one more embodiment of the present disclosure, it is also possible to connect one X capacitor to the negative output terminal and another X capacitor to the positive output terminal.

In accordance with still one more embodiment of the present disclosure, it is possible to use four X capacitors, two of which are connected to the negative output terminal and the other two are connected to the positive output terminal.

In accordance with yet one more embodiment of the present disclosure, it is possible to connect one X capacitor between one of the input AC power supply lines and an output terminal and rely on another X capacitor between the two input AC power supply lines in the EMI filter.

Switching devices that can be used in the system disclosed in the present disclosure are bipolar junction transistors (BJTs), insulated gate bipolar transistors (IGBTs) and metal oxide semiconductor field effect transistors (MOSFETs). However, in BJTs and IGBTs, parallel diodes have to be added, which adds to the component count. MOSFETs have advantages at high switching frequencies and they already contain parallel diodes. Hence MOSFETs are the preferred type of switches for the system disclosed in the present disclosure.

Figure 7:
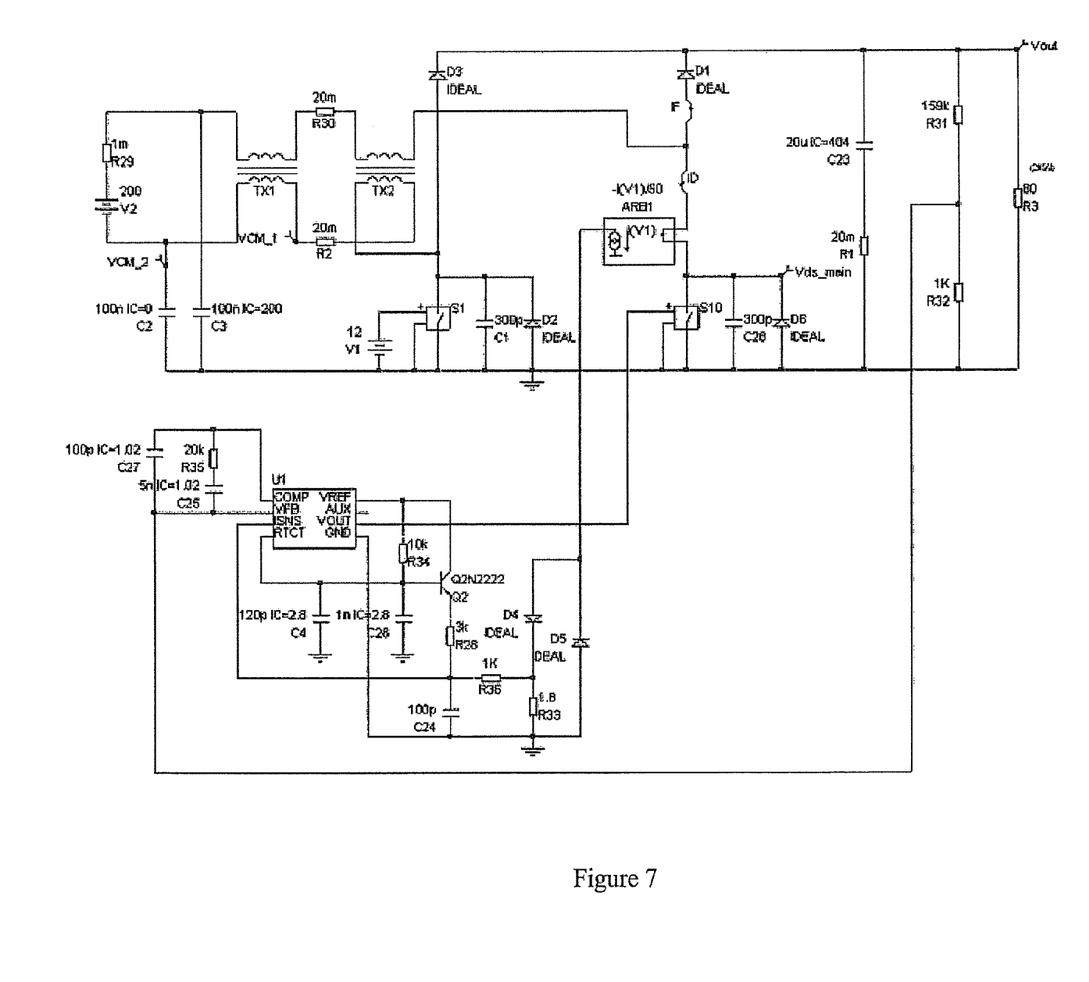
FIG. 7 illustrates a simulation circuit of a bridgeless boost PFC system with a common mode choke coupled with a common core boost choke.

FIG. 7 illustrates a circuit for simulation of the disclosure operating at 140 KHz with 2000 W output at 400V DC. To speed up the simulation, only a very small portion of the AC input waveform is simulated, and is represented by a 200V DC source V2. Again to speed up the simulation, the MOSFETs have been modeled using simple switches S1 and S10, with each switch having MOSFET output capacitance and body diode modeled using discrete components. Since the lower end of the DC source V2 is negative, switch 51 is biased 'ON' continuously by a voltage source V1, while switch S10 switches at 140 KHz. Some loss resistances have been added such as R1, R2, R29 and R30. Diodes D1 and D3 have been made ideal to speed up the simulation, but in a real design they could be STTH8S06D or similar fast recovery parts. Common mode choke TX1 has inductance of value 1 mH per winding while the common core boost choke TX2 has inductance of value 40 μH per winding. For this simplified simulation, a simple current mode PWM controller U1 has been used, which could be a UC3843. In a real application additional circuits would be needed to sense the AC line polarity and then direct the PWM drive signal to either switch S1 or S10 as appropriate, while the other switch is held in the 'ON' state continuously. ARB1 simulates a current transformer.

Figure 8:
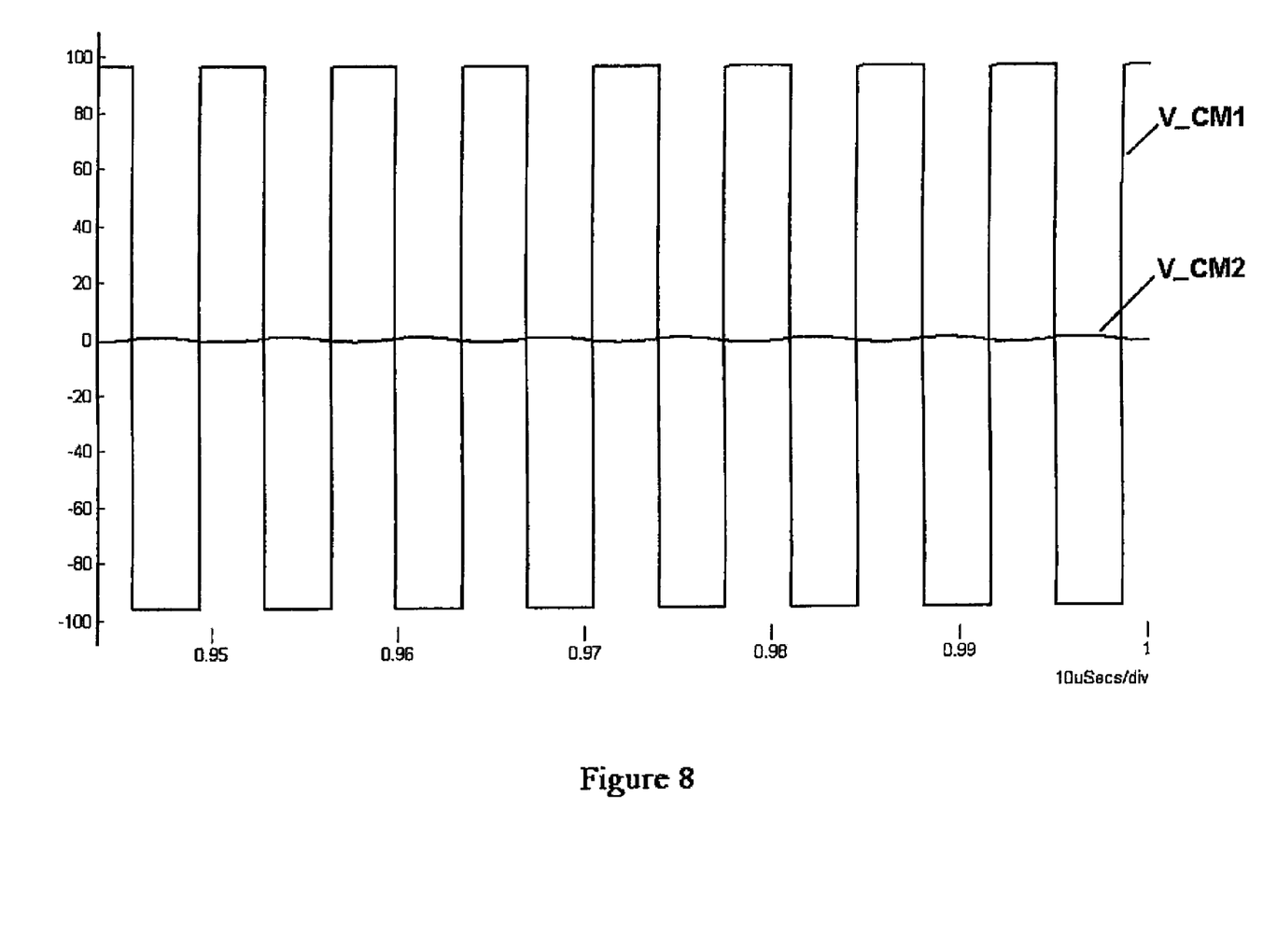
FIG. 8 illustrates a simulation waveform showing the common mode voltage attenuation obtained as a result of the simulation performed in accordance with the circuit in FIG. 7.

FIG. 8 illustrates a simulation waveform showing the common mode voltage attenuation obtained as a result of the simulation performed in accordance with FIG. 7. FIG. 8 shows the 200V peak to peak high slew rate common mode voltage (VCM_1) which appears at the inputs of the common core boost choke TX2. It also shows the common mode voltage which appears at the AC input (VCM_2) and it can be seen that the level is reduced to just a few volts peak to peak. This remaining low level common mode voltage can easily be handled by a conventional EMI filter (not shown in the simulation).

The bridgeless boost PFC system with reduced common mode conducted EMI as described in this disclosure has several technical advantages including, but not limited to, the realization of:

a compact system with reduced common mode conducted EMI;

a reliable and efficient system with reduced common mode conducted EMI;

a cost effective system with reduced common mode conducted EMI; and a simple and 'easy to work on and service system' with reduced common mode conducted EMI.

While considerable emphasis has been placed herein on the particular features of this disclosure, it will be appreciated that various modifications can be made, and that many changes can be made in the preferred embodiments without departing from the principle of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A bridgeless boost power factor correction (PFC) system comprising:
   a first input for connection to a first line of an alternating current (AC) source;
   a second input for connection to a second line of the AC source;
   an output for delivering an output of the bridgeless boost PFC system;
   a first boost choke coupled to the first input;
   a second boost choke coupled to the second input;
   a common mode choke coupled between the first and second inputs and the first and second boost chokes;
   a first X capacitor coupled between the first input and the output; and
   a second X capacitor coupled between the second input and the output.

2. The bridgeless boost PFC system of claim 1 wherein the first boost choke and the second boost choke are wound on a same magnetic core.

3. The bridgeless boost PFC system of claim 2, wherein the first boost choke and the second boost choke are wound in opposite directions on the magnetic core.

4. The bridgeless boost PFC system of claim 2, wherein the magnetic core is low permeability core.

5. The bridgeless boost PFC system of claim 1, further comprising an EMI filter coupled to the first and second inputs.

6. The bridgeless boost PFC system of claim 5 wherein the EMI filter includes at least one of an additional X capacitor, a Y capacitor, an additional common mode choke and a differential mode choke.

7. The bridgeless boost PFC system of claim 5, wherein said EMI filter is adapted to permit voltage boosting without disruption in the operation of said system.

8. The bridgeless boost PFC system of claim 1, wherein said common mode choke comprises a low loss transformer ferrite.

9. The bridgeless boost PFC system of claim 1, wherein said common mode choke is a high inductance choke.

10. The bridgeless boost PFC system of claim 1, wherein the capacitance of each of the first and second X capacitors is at least 100 nF.

11. The bridgeless boost PFC system of claim 1, wherein a number of turns on said common mode choke has no direct relationship to a number of turns on the first and second boost chokes.

12. The bridgeless boost PFC system of claim 1, wherein an additional X capacitor is coupled across said common mode choke to bypass its leakage inductance.

13. The bridgeless boost PFC system of claim 1, further comprising a Y capacitor coupled to ground.

14. The bridgeless boost PFC system of claim 1, further comprising at least one switch and a PWM controller for controlling the switch, wherein said PWM controller is adapted to receive signals from an AC input polarity sensing circuit for an 'always ON' or 'always OFF' switching methodology.

15. A method for power factor correction in an AC power current carrying system, said method comprising:
- receiving and storing energy from an AC power supply in a first boost choke and a second boost choke;
- presenting a relatively high input impedance to the boost chokes;
- rectifying the incoming AC power using a combination of a pair of rectifier diodes and semiconductor switches;
- controlling a duty cycle of the semiconductor switches; and
- bypassing an input line of the AC power supply to an output terminal with a relatively low impedance so that a small high frequency potential difference exists between the input line of the AC power supply and said output terminal to reduce common mode conducted electromagnetic interference (EMI).

16. The method of claim 15, further comprising filtering EMI from the AC power supply.

17. An AC power supply unit including a PFC system of claim 1.

\* \* \* \* \*

UNITED STATES PATENT AND TRADEMARK OFFICE
CERTIFICATE OF CORRECTION

PATENT NO. : 8,289,737 B2  
APPLICATION NO. : 12/539045  
DATED : October 16, 2012  
INVENTOR(S) : Kevin D. Wildash Page 1 of 1

It is certified that error appears in the above-identified patent and that said Letters Patent is hereby corrected as shown below:

In column 5, line 21, replace "51" with "S1".

Signed and Sealed this  
Fourth Day of December, 2012

David J. Kappos  
*Director of the United States Patent and Trademark Office*